(12) United States Patent
Martinez Hernandez Magro et al.

(10) Patent No.: US 11,257,026 B2
(45) Date of Patent: Feb. 22, 2022

(54) METHOD, SYSTEM, AND COMPUTER READABLE PROGRAM STORAGE DEVICE FOR DISTRIBUTION AND DELIVERIES THROUGH AUTOMATIC DRIVER SELECTION BASED ON PATTERNS

(71) Applicant: Kyndryl, Inc., New York, NY (US)

(72) Inventors: Agueda Martinez Hernandez Magro, Zapopan (MX); Kulvir S. Bhogal, Fort Worth, TX (US); Rick A. Hamilton, II, Charlottesville, VA (US); Gregory J. Boss, Saginaw, MI (US)

(73) Assignee: Kyndryl, Inc., New York, NY (US)

( * ) Notice: Subject to any disclaimer, the term of this patent is extended or adjusted under 35 U.S.C. 154(b) by 394 days.

(21) Appl. No.: 16/250,446

(22) Filed: Jan. 17, 2019

(65) Prior Publication Data
US 2020/0234235 A1 Jul. 23, 2020

(51) Int. Cl.
*G06Q 10/08* (2012.01)
*G01C 21/34* (2006.01)

(52) U.S. Cl.
CPC ....... *G06Q 10/0834* (2013.01); *G01C 21/343* (2013.01); *G01C 21/3415* (2013.01); *G06Q 10/08355* (2013.01)

(58) Field of Classification Search
CPC ............... G06Q 10/02; G06Q 10/0834; G06Q 10/08355; G01C 21/3415; G01C 21/343
(Continued)

(56) References Cited

U.S. PATENT DOCUMENTS 6,690,997 B2 2/2004 Rivalto
2007/0257774 A1* 11/2007 Stumpert ............... G06Q 10/08
340/7.1
(Continued)

FOREIGN PATENT DOCUMENTS

WO WO2010125499 A1 11/2010
WO WO 2018091185 A1 * 5/2018 ............. G06Q 50/30

OTHER PUBLICATIONS

John Miller, Crowdsourced Urban Package Delivery, Modeling Traveler Willingness to Work as Crowdshippers, Transportation Research Record: Journal of the Transportation Research Board, vol. 2610, Issue 1, pp. 67-75. (Year: 2017).*
(Continued)

*Primary Examiner* — Allison G Wood
*Assistant Examiner* — John G Webster
(74) *Attorney, Agent, or Firm* — Scully, Scott, Murphy & Presser, PC; Ken Han, Esq.

(57) ABSTRACT

A method, system and computer program product related to delivery of packages to online shopping customers. In an embodiment, the invention provides a method comprising identifying a pool of candidate delivery drivers; analyzing driving patterns of the candidate drivers in a geographic area; analyzing activities of specified online shoppers in the geographic area; and sending a message to contact one of the candidate drivers to deliver a package or packages to an online shopper based on a defined matching of the analyzed driving patterns of the candidate drivers with the analyzed activities of the online shoppers. In an embodiment, each of the candidate drivers has an associated mobile communications device; and the analyzing driving patterns of the candidate drivers includes using specified changes in locations of the mobile communication devices associated with
(Continued)

the candidate delivery drivers to identify the driving patterns of the candidate drivers.

12 Claims, 8 Drawing Sheets

(58) Field of Classification Search
USPC ........ 705/334, 338; 701/411, 412, 413, 414, 701/527
See application file for complete search history.

(56) References Cited

U.S. PATENT DOCUMENTS

| | | | |
|---|---|---|---|
| 2010/0114626 A1 | 5/2010 | Piccinini et al. | |
| 2010/0280884 A1 | 11/2010 | Levine et al. | |
| 2013/0080347 A1 | 3/2013 | Paul et al. | |
| 2014/0278635 A1* | 9/2014 | Fulton | G06Q 10/063112 705/7.14 |
| 2014/0330739 A1* | 11/2014 | Falcone | G06Q 10/08355 705/338 |
| 2015/0081585 A1 | 3/2015 | Kadaba | |
| 2015/0227890 A1* | 8/2015 | Bednarek | G06Q 30/0635 705/26.81 |
| 2015/0278712 A1 | 10/2015 | Fujita et al. | |
| 2016/0019496 A1* | 1/2016 | Gorlin | H04L 67/104 705/333 |
| 2016/0048804 A1 | 2/2016 | Paul et al. | |
| 2016/0071056 A1* | 3/2016 | Ellison | G06Q 10/08355 705/338 |
| 2016/0096508 A1 | 4/2016 | Oz et al. | |
| 2016/0189098 A1 | 6/2016 | Beaurepaire et al. | |
| 2017/0046658 A1* | 2/2017 | Jones | G06Q 10/08355 705/338 |
| 2018/0012151 A1* | 1/2018 | Wang | G06Q 10/1093 |
| 2018/0082504 A1* | 3/2018 | Park | G07C 9/00571 701/36 |
| 2020/0019894 A1* | 1/2020 | Jin | G05D 1/0291 |

OTHER PUBLICATIONS

Alan C McKinnon ,Crowdshipping, A communal approach to reducing urban traffic levels?, Logistics White Paper Jan. 2016 (Year: 2016).*

"Amazon Flex", https://flex.amazon.com/, last printed Nov. 1, 2016, 9 paged.

* cited by examiner

METHOD, SYSTEM, AND COMPUTER READABLE PROGRAM STORAGE DEVICE FOR DISTRIBUTION AND DELIVERIES THROUGH AUTOMATIC DRIVER SELECTION BASED ON PATTERNS

BACKGROUND

This invention, generally, relates to package deliveries for on-line shopping companies, and more specifically, to recommending people to be enlisted to deliver packages based on user destination patterns.

Successful online shopping companies are those that make their customers or clients happy by getting their deliveries fast. Users that want their products shipped in a relatively short period need to pay extra for prime delivery which means they may receive their products the following day after ordering the product. To do this, online shopping companies have to invest in having physical warehouses around the countries they serve to minimize the shipping time and to warranty a next day delivery.

Online shopping companies use large commercial delivery companies to deliver their products, and this extra cost is paid by the end user.

SUMMARY

Embodiments of the invention provide a method, system and computer program product. In an embodiment, the invention provides a method comprising identifying, by one or more processors, a pool of candidate delivery drivers; analyzing, by the one or more processors, driving patterns of the pool of candidate delivery drivers in a given geographic area; analyzing, by the one or more processors, activities of specified online shoppers in said given geographic area; and sending, by the one or more processors, a message to contact one or more of the pool of candidate drivers to deliver one or more packages to one or more of the online shoppers based on a defined matching of said analyzed driving patterns of the pool of candidate delivery drivers with the analyzed activities of the online shoppers.

In an embodiment, each of the candidate delivery drivers of the pool of candidate delivery drivers has an associated mobile communications device; and the analyzing driving patterns of the pool of candidate delivery drivers includes using specified changes in locations of the mobile communication devices associated with the pool of candidate delivery drivers to identify the driving patterns of the pool of candidate delivery drivers.

Embodiments of the invention provide an opt-in system which analyzes recurring routes driven, and makes recommendations for people to be enlisted as delivery drivers based on analytic determination of user destination patterns. In embodiments of the invention, the online shopping company ships one big box having many packages to that enlisted delivery driver instead of sending many different separate packages, and the delivery driver distributes the packages as he or she drives his or her regular routes, providing economical benefits to both the online shopping company and the delivery driver. The online shopping company can offer discounts for delivery drivers; and for example, for every delivery the driver performs, the driver may get a coupon for future shopping, giving extra benefits for drivers.

The delivery drivers can then have a regular day-to-day job that offers them insurance and other benefits, and the extra money they can get for driving their regular routes to deliver the packages are an extra benefit for the drivers.

Standard shipping time frame is around four-to-five days in the Unites States. However, some online shopping companies also offer two-day delivery or even same-day delivery in certain cities to their prime customers. Online shopping companies are investing a lot of money to expedite delivery, and these companies need to look for opportunities to reduce the cost of providing expedited delivery.

In another embodiment, the invention provides moving hubs, where the delivery company (hired by the online shopping company) can deliver the products, depending on location so that the delivery drivers can pick up the packages to distribute them.

In another embodiment, the invention uses a shared trunk space, where the delivery company can deliver a big package to the delivery driver's vehicle. For example, using position locating services, the delivery company can identify where the vehicle of the delivery driver is, and notify the driver that the delivery company is close and ready to deliver packages to the driver. The delivery driver can use his or her mobile phone to open the trunk of the vehicle when the commercial delivery company is there so the commercial delivery company can leave the packages for the delivery driver. At the end of their activities that day at this location, the delivery driver drives his vehicle to deliver the packages without having to wait for the package or having to drive to a certain location to pick up the packages.

Embodiments of the invention provide a delivery scheduling system that analyzes users' standard driving routes and automatically recruits drivers in real time using the following methods:

1. A method to correlate package delivery destinations with known users' regular (daily) driving routes;
2. A method to recruit drivers and transfer package delivery to an alternate driver while mid-route; and
3. A method to give temporary access to a limited portion of a vehicle for a mid-route package transfer.

DETAILED DESCRIPTION

Embodiments of the invention relate to package deliveries for on-line shopping companies. Embodiments of the invention increase the efficiency of shipping systems for the purpose of delivering packages. This is done, in embodiments of the invention, by having these systems deliver packages more efficiently.

Figure 1:
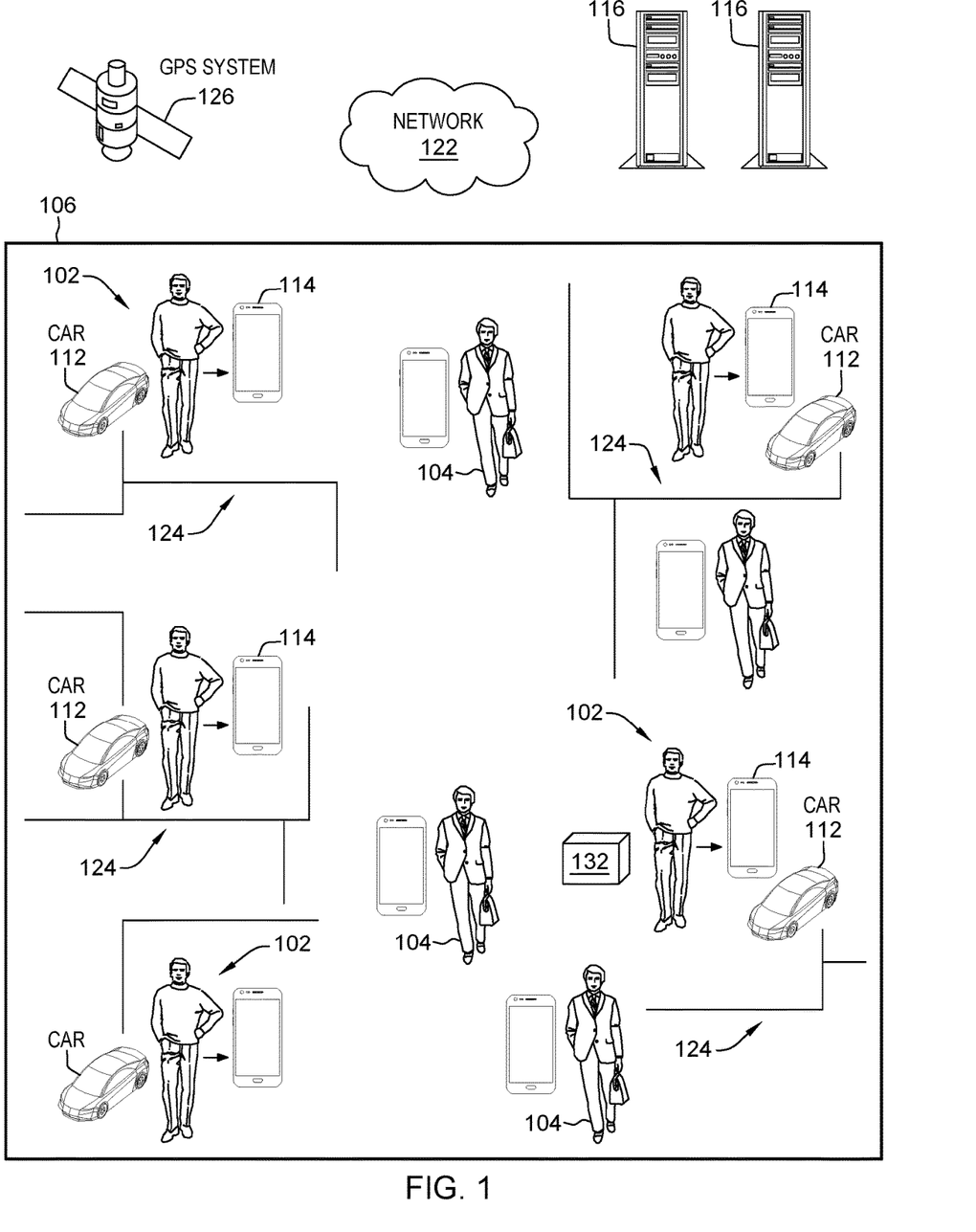
FIG. 1 illustrates a system in accordance with an embodiment of the invention.

FIG. 1 shows an example system that may be used in an implementation of an embodiment of the invention. FIG. 1 shows a pool of candidate delivery drivers 102 and a plurality of online shoppers 104 in a geographic area 106, and a vehicle 112 and a mobile communications device 114 are associated with each of the candidate delivery drivers 102. FIG. 1 also shows a pair of computer servers 116 for processing data and information used in the implementation of the embodiment of the invention, a network 122 for transmitting data and information between and among the various devices in the system. In addition, FIG. 1 represents at 124 a plurality of routes that may be taken by the pool of candidate delivery drivers, and a GPS system 126 that may be used to locate vehicles and other devices or items.

In an embodiment, the invention provides a method comprising identifying a pool of candidate delivery drivers 102; analyzing driving patterns of the pool of candidate delivery drivers in a given geographic area 106; analyzing activities of specified online shoppers 104 in said given geographic area; and sending a message to contact one or more of the pool of candidate drivers to deliver one or more packages 132 to one or more of the online shoppers based on a defined matching of said analyzed driving patterns of the pool of candidate delivery drivers with the analyzed activities of the online shoppers.

Embodiments of the invention relate to recommending people to be enlisted to deliver packages based on user destination patterns. Typically, commercial delivery drivers for online shopping companies have a fixed shift and the drivers need to be at a warehouse a fixed amount of time before their scheduled shift starts to get the packages they will distribute. Also, to deliver the packages, the commercial drivers need to follow the routes set by the online shopping companies.

Recently, some commercial delivery drivers have been given more flexibility. In a more flexible program, the delivery drivers need to sign-up for a determined shift on a weekly basis, although there may be open shifts daily depending on availability. However, there is no guarantee to the drivers that they will get to deliver enough packages to recover the investment on time and gas expenses for this to be a good deal for the drivers.

In an embodiment, each of the candidate delivery drivers 102 of the pool of candidate delivery drivers has an associated mobile communications device 114; and the analyzing driving patterns of the pool of candidate delivery drivers includes using specified changes in locations of the mobile communication devices associated with the pool of candidate delivery drivers to identify the driving patterns of the pool of candidate delivery drivers.

Embodiments of the invention provide an opt-in system in which people who have volunteered for the program are recommended as delivery drivers based on analytic determination of their regular driving patterns. The drivers have an opportunity to earn extra money without any significant impact on their regular travel patterns, and the online shopping companies have their packages delivered in a way that is more cost effective than their current delivery system.

In embodiments of the invention, a user agrees to an anonymous analysis of his or her travel patterns when the user signs up for an online shopping services. One day, the user receives a message on his or her phone, e.g., "We've noticed that you drive often from the Barton Hills (Austin) neighborhood to the West University (Austin) neighborhood, everyday. Several deliveries are daily performed in the same path. If you would like to apply for a role as a Delivery Driver, then you could make upwards of $60 per week, simply deviating a bit to perform deliveries."

By doing so, this service provides income for the driver, provides income for the company, and provides societal benefits by doing deliveries using a car that is already on the road, avoiding having more cars doing the deliveries, i.e., increasing overall roadway efficiency by mitigating traffic and cutting down pollution. Furthermore, the analysis of driving patterns, as ascertained by way of the mobile device 114 of the user 102, could in some embodiments help determine whether someone is a good candidate for being a delivery driver. For instance, if the correlation of a mobile device's movement indicates that it often travels in excess of the speed limit, goes through stop signs, or otherwise drives erratically, then the online shopping company may decide not to offer the role of delivery driver to this driver. If, conversely, such analysis indicates a pattern of good driving habits, then that may serve as a necessary condition for this user to be offered the role.

As an example, a system in accordance with an embodiment of the invention can observe that user A works at 123 Highland Street and leaves the office at 5:30 pm heading to 342 Corn street. The system can further observe that user B often shops online at a particular online shopping site on Wednesday and lives at 355 Corn Street. The system can propose that user A deliver the packages to user B on user A's way home from work on Wednesday. In an ideal scenario, the system would identify multiple packages that could be delivered on Driver A's way home from work, and a commercial package delivery driver would stop at 123 Highland Street sometime before 5:30 pm and drop off the packages inside Driver A's vehicle.

As another example, if many people who work at a particular corporate office building shop online and go to the office every day, a commercial package delivery company can deliver a big box of packages to that corporate office building, and the delivery driver can distribute the packages there.

Figure 2:
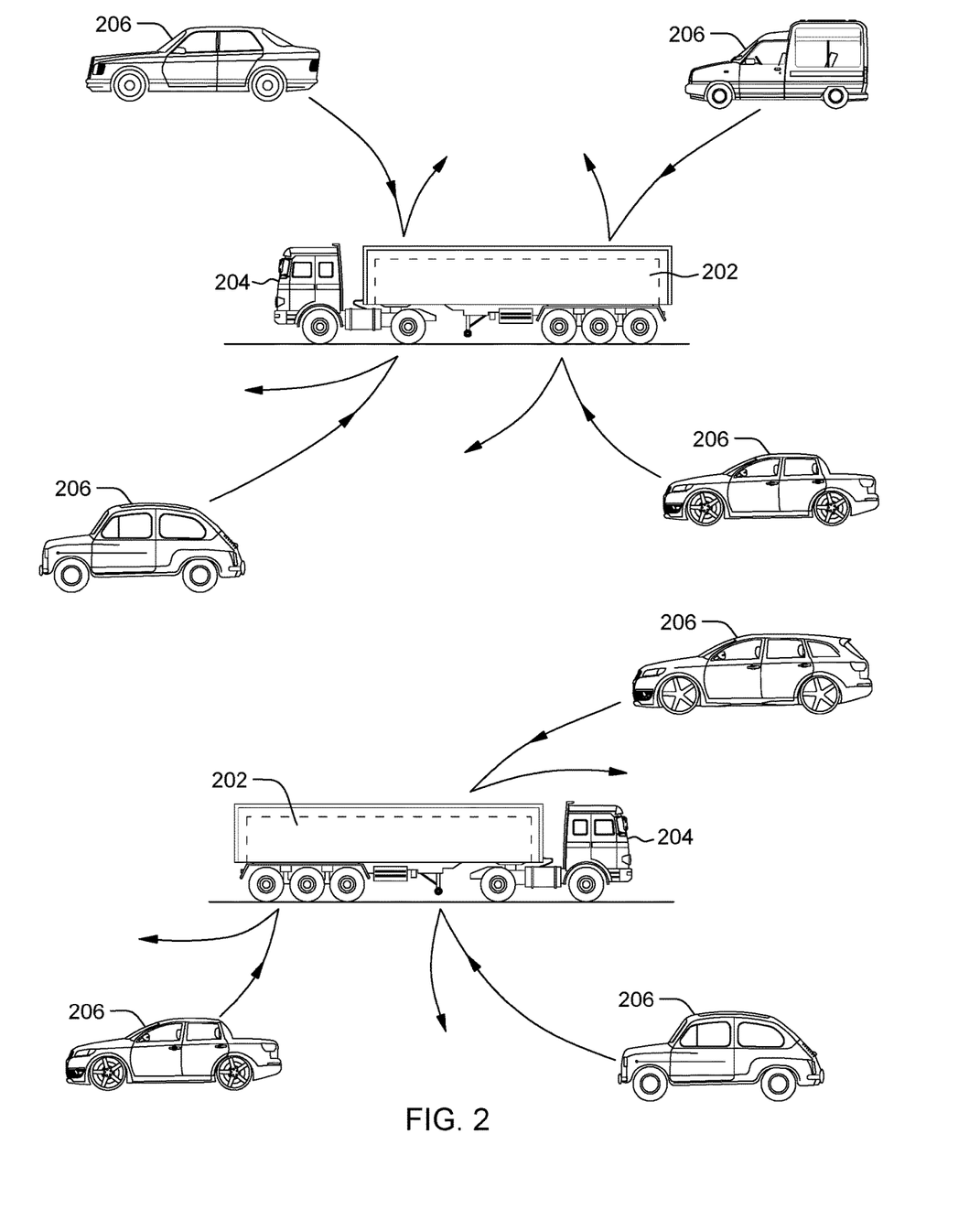
FIG. 2 shows an embodiment of the invention in which small warehouses are transported by trucks to pick-up locations.

In another embodiment, the invention provides moving hubs, where the delivery company (hired by the on-line shopping company) can deliver the products depending on location, so that the delivery drivers can pick up the packages to distribute them. FIG. 2 illustrates an example of this embodiment. In this embodiment of FIG. 2, small moving warehouses 202 in large trucks 204, make it easier for the last leg drivers 206 to pick up the items from the mobile warehouses and deliver the items. For example, there may be a lot of drivers that are going to deliver packages to zip code 76123, Rather than having all of these drivers come to a fixed location warehouse, a truck can go to the 76123 zip code and the drivers pick up packages from the mobile warehouses/hub and do the last leg of the delivery.

Figure 3:
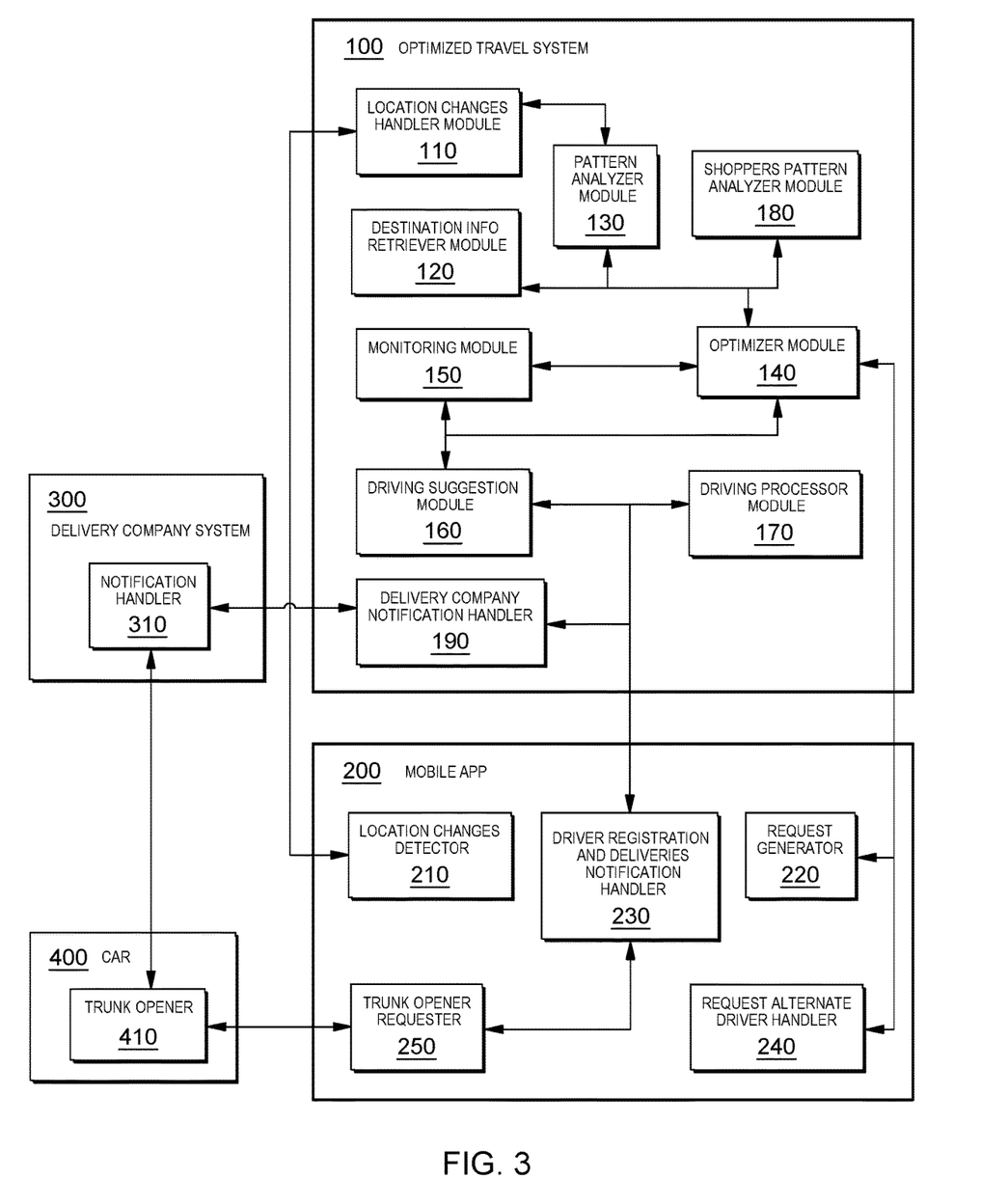
FIG. 3 is a schematic block diagram illustrating components of a system in accordance with embodiments of the invention.

FIG. 3 is a schematic block diagram illustrating components of a system in accordance with an embodiment of the invention. This embodiment of the system comprises four groups of modules. A first group of the modules are used in an optimized travel system 100, and a second group of the modules are used on the mobile app 200 of a volunteer potential driver. A notification handler 310 is used by the delivery company system 300, and a trunk opener module 410 is used on the vehicle 400 of the volunteer potential driver.

The modules in the optimized travel system 100 include a location changes handler module 110, a destination information retriever module 120, a pattern analyzer module 130, an optimizer module 140, a monitoring module 150, a driving suggestion module 160, a driving processor module 170, a shoppers pattern analyzer module 180, and a delivery company notification module 190.

The modules in the mobile application 200 include a location changes detector 210, a request generator 220, a driver registration and deliveries notification handler 230, a request alternate driver handler 240, and a trunk opener requestor 250.

The modules are in communication with other modules and send and receive data as indicated in FIG. 3. For example, the location changes handler 110 is in communication with the pattern analyzer module 130 and with the location changes detector 210. The optimizer module 140 receives data from and sends data to the pattern analyzer module 130, the destination information retriever module 120, and the shoppers pattern analyzer module 180. The optimizer module 140 is also in communication with the monitoring module 150, the request generator 220 and the request alternate driver handler 240. The driver registration and deliveries notification handler 230 is in communication with the driving suggestion module 160, the driving processor module 170, and the delivery company notification handler 190. The driver registration and deliveries notification handler 230 is also in communication with the trunk opener requestor 250.

Figure 4:
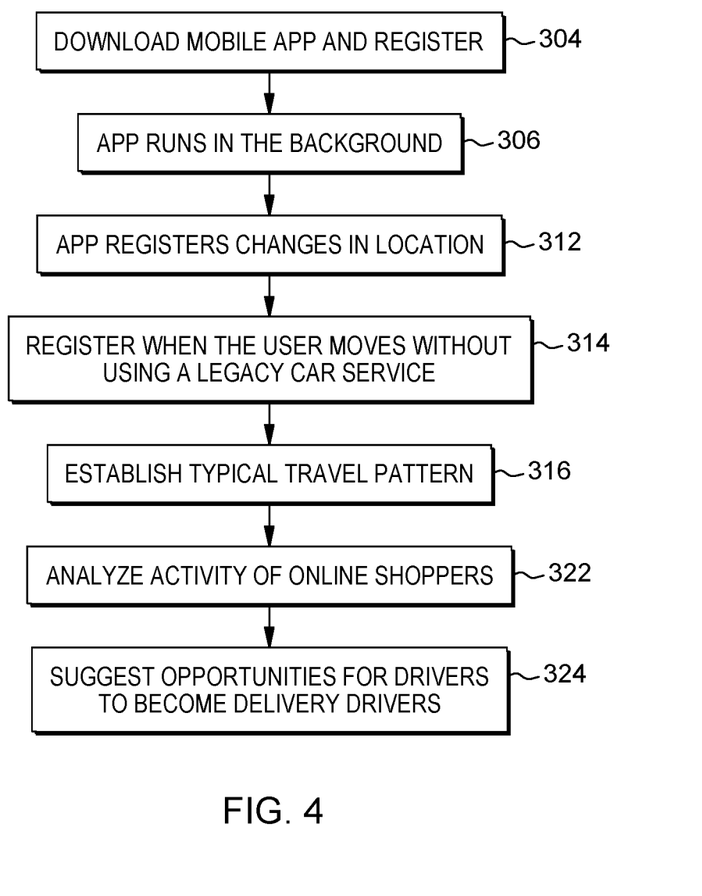
FIG. 4 shows a procedure to correlate package delivery destinations with the regular driving routes of known persons.

FIG. 4 illustrates a method, in accordance with an embodiment of the invention, to correlate package delivery destinations with known users' regular (daily) driving routes. At 304, a person downloads the mobile app and registers on the system. As represented at 306, the app runs in the background. At 312, when the location of the user changes, the app registers the change. At 314, the system registers when the user moves without using a legacy car service; then denotes movement which may be self-driven. At 316, by analyzing patterns of user location changes, the system can establish a user's "typical travel pattern," e.g., for weekdays or other recurring movement.

In this analysis, the system will analyze when a potential deliverer goes from location to location. Tracking of location of a GPS based device is known in the art. As more and more data of a potential deliverer's commute tendency is collected over time, patterns can be established as to what people's normal commutes are. For example, a person might go from location A to location B every Monday and Wednesday, from location A to location C every Tuesday and Thursday, and from location A to location D every Friday. Driving patterns are established with time and become more and more accurate and predictable with additional data.

At 322, the system analyzes the activity of online shoppers in the area the driver is moving. At 324, the system suggests opportunities for drivers to become delivery drivers, getting extra money for travelling their normal routes.

In embodiments of the invention, the system seeks to get a delivery driver that does not have to go out of their way to pick up the package and deliver it. This helps to achieve the goal of not having the driver deviate too far from their normal driving routine. That being the case, the proximity to the pick up and drop off points is a main factor in selecting a driver.

On-line shopping companies do not want to lose their reputation for being able to deliver items quickly to their customers. That being the case, the system can, in embodiments of the invention, prioritize and rate drivers higher that deliver their packages successfully in a timely manner and can weed out, or eliminate, drivers that opted into the delivery program but caused delays in delivering packages to their recipients.

The above-discussed rating may also be considered when, for instance, it is necessary to determine between two drivers who are close to the drop-off location but neither actually goes along that route normally. In embodiments of the invention, the system is an opt-in system. People are not required to be a deliverer. It is a volunteer based model. A potential deliverer can see how far they would have to deviate from their commute and determine if they are willing to deviate in return for the compensation they would receive from the company paying them.

Driver rating, length of service in the program, safety record of the driver, reliability of the driver are factors, among other factors, that can be used in picking a driver. Given the end goal is that the shipping company want to get the package to the recipient in a timely and safe manner, factors associated with this end goal would be weighted higher.

Figure 5:
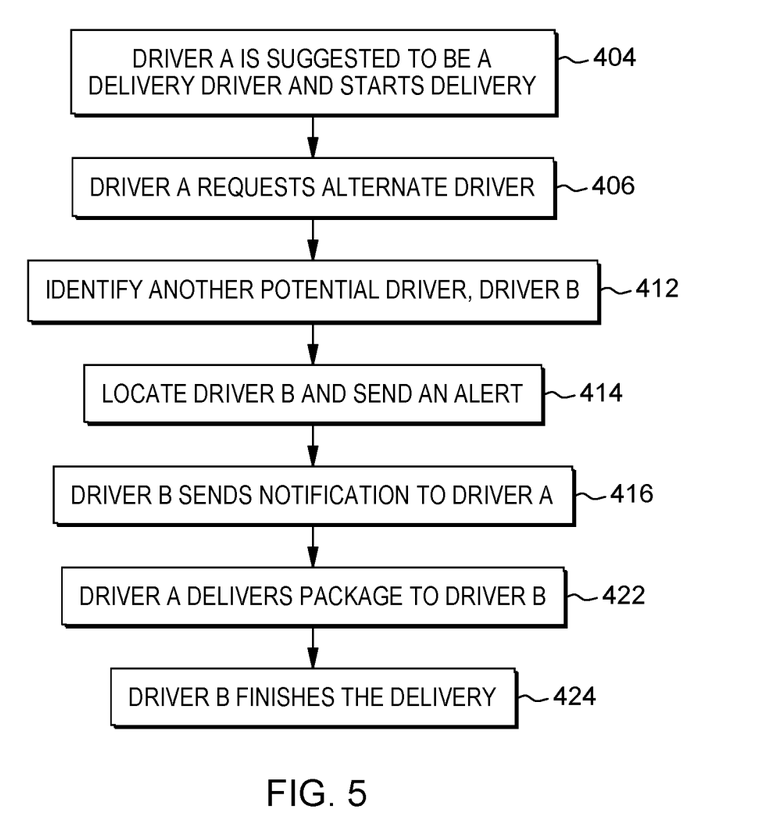
FIG. 5 is a diagram illustrating a method to recruit drivers and to transfer package delivery to an alternate driver while mid-route.

FIG. 5 shows a method, in accordance with an embodiment of the invention, to recruit drivers and transfer package delivery to an alternate driver while mid-route. As represented at 404, Driver A is suggested by the system to be a delivery driver, as he goes to a certain destination every day at a certain time (see method of FIG. 4). At 406, in a particular day, Driver A needs to deviate from the regular route for any reason and has some packages to deliver, so Driver A opens the mobile app and clicks on a Request Alternate Driver button. At 412, the system analyzes the database of potential delivery drivers and locates another potential driver, Driver B, who is driving to the original destination and is near Driver A.

As mentioned above, in embodiments of the invention, a rating system may be used to select the drivers. The system can prioritize and rate drivers higher that deliver their packages successfully in a timely manner. Driver rating, length of service in the program, safety record of the driver, and reliability of the driver are factors, among others, that can be used in picking a driver.

At 414, the system locates driver B using geolocation services and sends an alert to Driver B, with a message saying, for example, you are about to win $X if you just stop for one minute and receive X number of packages from a car with license YYYYY to be delivered to where you are going.

At 416, Driver B pushes a button on the mobile app and the system sends a notification to Driver A to locate the car with license ZZZZZ that will be parked at C place. At 422, Driver A arrives at Driver B's location, and delivers the packages to Driver B. At 424, Driver B finishes the delivery, while both drivers get extra money and the client delivery time is not affected.

Figure 6:
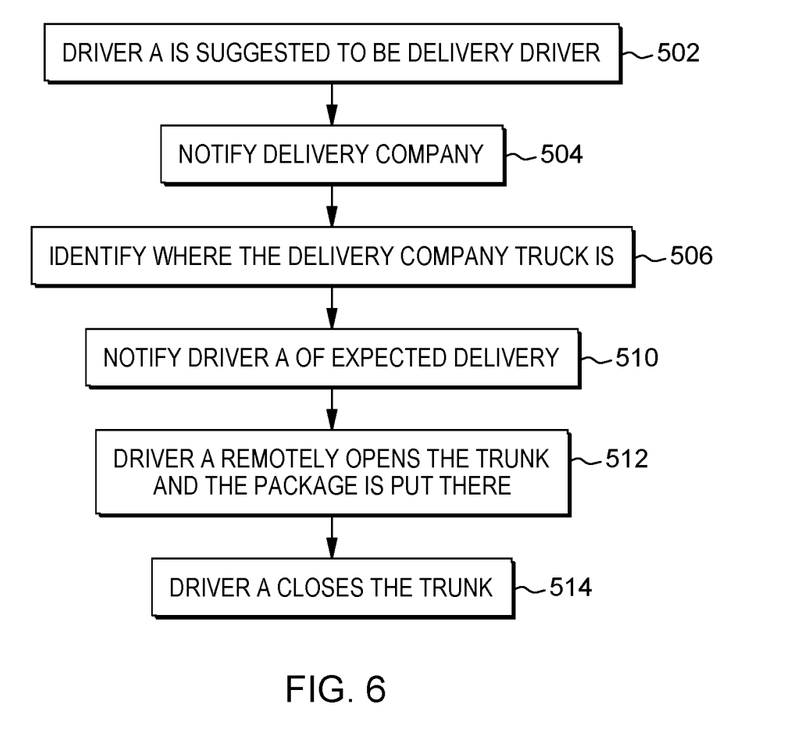
FIG. 6 illustrates a method to give temporary access to a limited portion of a vehicle for a mid-route package transfer.

FIG. 6 illustrates a method, in accordance with an embodiment of the invention, to give, from a remote location, temporary access to a limited portion or area of a vehicle for a mid-route package transfer. As represented at 502, Driver A is suggested by the system to be a delivery driver, as he goes to a certain destination every day at a certain time (see method of FIG. 4). At 504, the system notifies the delivery company that Driver A is the delivery driver assigned for certain packages that the delivery company is carrying. At 506, using geolocation services, the system identifies where the delivery company truck is at a time; and if that truck is near to where Driver A's vehicle is, the system suggests to the delivery company to drop the packages at Driver A's vehicle. At 510, upon confirmation of the delivery company to drive to Driver's A vehicle, the system notifies driver A of the expected timeframe of the delivery company arriving at his vehicle.

At 512, upon arrival, confirmed, for example, by a photo sent to Driver A, and due to the Driver A's vehicle being an intelligent car (in an IoT environment), Driver A, from a remote location and using his mobile phone, opens the trunk of his vehicle so that the delivery company can put the packages there. The rest of the car remains inaccessible as Driver A only allowed the trunk to be opened. At 514, Driver A closes the trunk of his vehicle when confirming all the packages have been entered in the trunk, saving time and money for not having the need to drive to a warehouse to pick up the packages.

Figure 7:
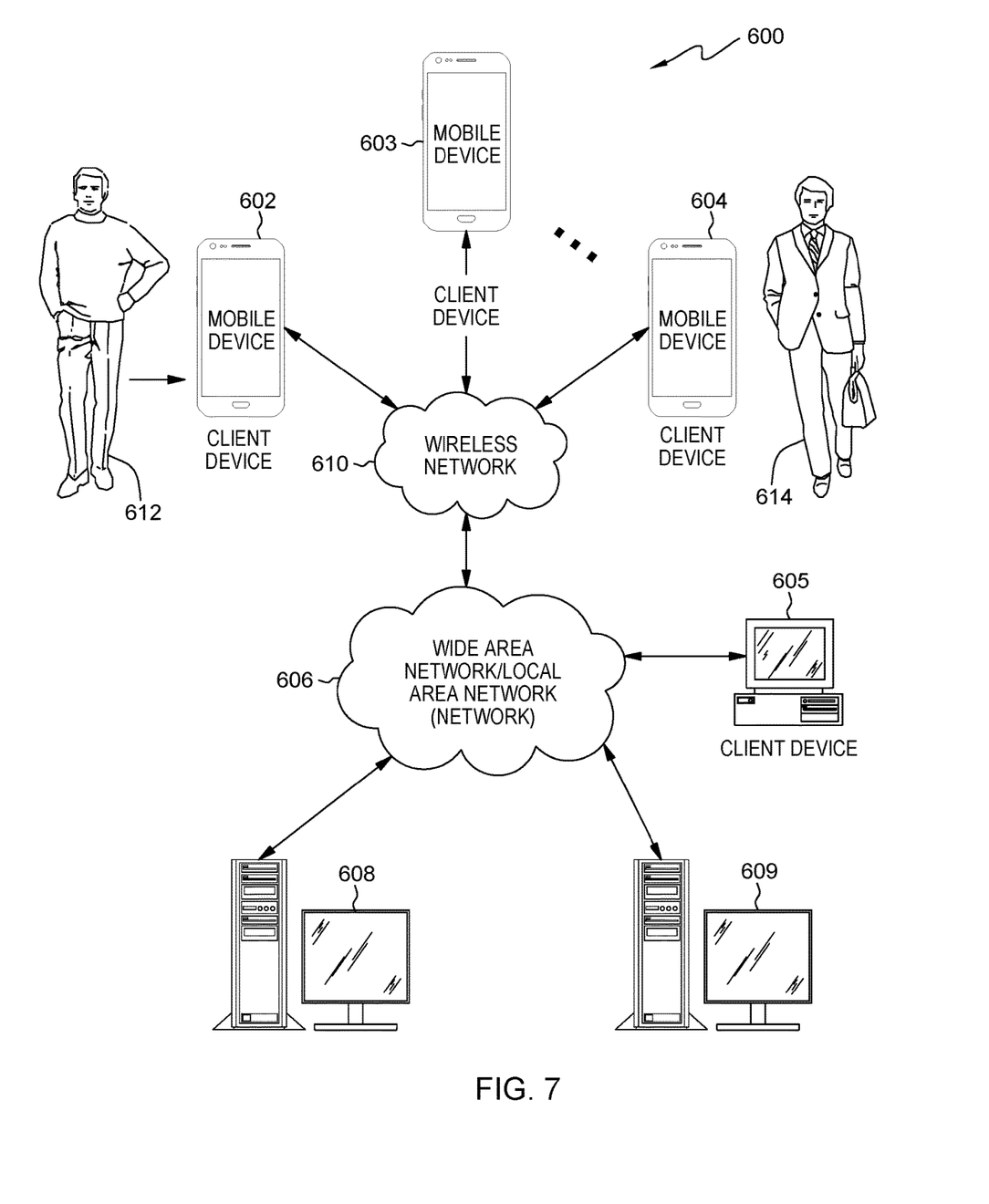
FIG. 7 shows a computer network that may be used in embodiments of the invention.

FIG. 7 shows components of an exemplary environment 600 in which the invention may be practiced. Not all the illustrated components may be required to practice the invention, and variations in the arrangement and type of the components may be made without departing from the spirit or scope of the invention. As shown, system 600 of FIG. 7 includes local area networks ("LANs")/wide area network 606, wireless network 610, mobile devices 602-604, client device 605, and servers 608-609.

Generally, mobile devices 602-604 may include virtually any portable computing device that is capable of receiving and sending a message over a network, such as networks 606 and wireless network 610. Such devices include portable devices, such as cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 602-604 typically range widely in terms of capabilities and features.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message.

Mobile devices 602-604 may each receive messages sent from servers 608-609, from one of the other mobile devices 602-604, or even from another computing device. Mobile devices 602-604 may also send messages to one of servers 608-609, to other mobile devices, or to client device 605, or the like. Mobile devices 602-604 may also communicate with non-mobile client devices, such as client device 605, or the like.

Wireless network 610 is configured to couple mobile devices 602-604 and its components with network 606. Wireless network 610 may include any of a variety of wireless sub-networks that may further overlay stand-alone ad-hoc networks, and the like, to provide an infrastructure-oriented connection for mobile devices 602-604. Such sub-networks may include mesh networks, Wireless LAN (WLAN) networks, cellular networks, and the like.

Network 606 is enabled to employ any form of computer readable media for communicating information from one electronic device to another. Also, network 606 can include the Internet in addition to local area networks (LANs), wide area networks (WANs), direct connections, such as through a universal serial bus (USB) port, other forms of computer-readable media, or any combination thereof.

Servers 608-609 include virtually any device that may be configured to provide an application service. Such application services or simply applications include, but are not limited to, email applications, search applications, video applications, audio applications, graphic applications, social networking applications, text message applications, or the like. In one embodiment, servers 608-609 may operate as web servers. However, servers 608-609 are not limited to web servers.

Those of ordinary skill in the art will appreciate that the architecture and hardware depicted in FIG. 7 may vary.

Figure 8:
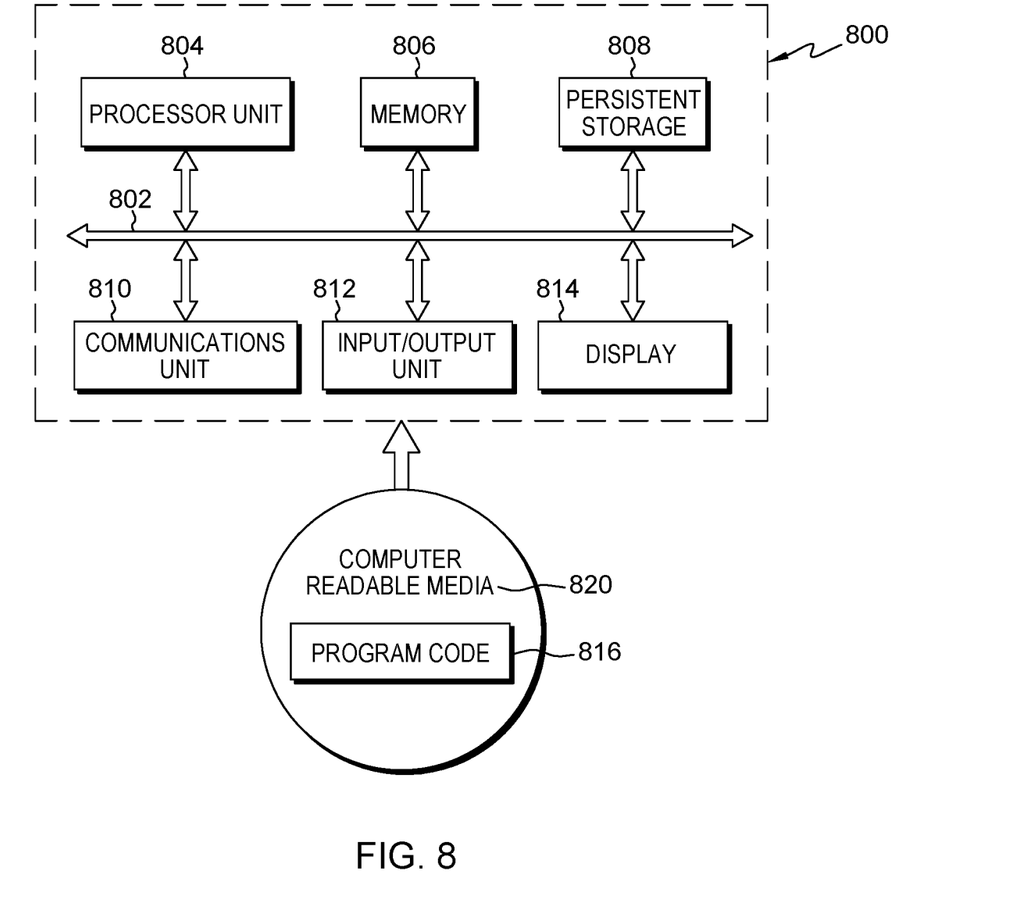
FIG. 8 shows a processing unit that may be used in embodiments of the invention.

With reference to FIG. 8, a block diagram of a data processing system 800 is shown. Data processing system 800 is an example of a processing unit that may be used in, or with, embodiments of the invention. For example, data processing system 800 may also be used in or with network 600 of FIG. 7.

In this illustrative example, data processing system 800 includes communications fabric 802, which provides communications between processor unit 804, memory 806, persistent storage 808, communications unit 810, input/output (I/O) unit 812, and display 814.

Processor unit 804 serves to execute instructions for software that may be loaded into memory 806. Processor unit 804 may be a set of one or more processors or may be a multi-processor core, depending on the particular implementation. Memory 806 and persistent storage 808 are examples of storage devices. Memory 806, in these examples, may be a random access memory or any other suitable volatile or non-volatile storage device. Persistent storage 808 may take various forms depending on the particular implementation. For example, persistent storage 808 may be a hard drive, a flash memory, a rewritable optical disk, a rewritable magnetic tape, or some combination of the above.

Communications unit 810, in these examples, provides for communications with other data processing systems or devices. In these examples, communications unit 810 is a network interface card. Communications unit 810 may provide communications through the use of either or both physical and wireless communications links. Input/output unit 812 allows for input and output of data with other devices that may be connected to data processing system 800. For example, input/output unit 812 may provide a connection for user input through a keyboard and mouse. The input/output unit may also provide access to external program code 816 stored on a computer readable media 820. In addition, input/output unit 812 may send output to a printer. Display 814 provides a mechanism to display information to a user.

Those of ordinary skill in the art will appreciate that the hardware in FIG. 8 may vary depending on the implementation. Other internal hardware or peripheral devices, such as flash memory, equivalent non-volatile memory, or optical disk drives and the like, may be used in addition to or in place of the hardware depicted in FIG. 8.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The description of the invention has been presented for purposes of illustration and description, and is not intended to be exhaustive or to limit the invention in the form disclosed. Many modifications and variations will be apparent to those of ordinary skill in the art without departing from the scope of the invention. The embodiments were chosen and described in order to explain the principles and applications of the invention, and to enable others of ordinary skill in the art to understand the invention. The invention may be implemented in various embodiments with various modifications as are suited to a particular contemplated use.

The invention claimed is:

1. A method comprising:
identifying, by one or more processors, a pool of candidate delivery drivers, each of the candidate delivery drivers of the pool of candidate delivery drivers having an associated mobile communications device, the identifying a pool of candidate delivery drivers includes receiving, at the one or more processors, requests from persons to be in the pool of candidate delivery drivers, and the request from each of said persons including an agreement by said each person to an anonymous analysis of travel patterns of said each person;

tracking, based on location data received from a geolocation system over time, locations of each candidate delivery driver's mobile communications device to obtain specified changes in locations of the mobile communication devices associated with each driver of the pool of candidate delivery drivers;

using said obtained specified changes in locations to identify, by the one or more processors, a driving pattern of each respective candidate delivery driver of the pool of candidate delivery drivers;

analyzing, by the one or more processors, the driving patterns of the pool of candidate delivery drivers in a given geographic area, wherein the analyzing driving patterns of the pool of candidate delivery drivers includes identifying routes within the given geographic area, and times of the identified routes, of the pool of candidate delivery drivers;

analyzing, by the one or more processors, activities of specified online shoppers in said given geographic area;

sending, by the one or more processors, a message over a communications network to contact one or more of the pool of candidate drivers to deliver one or more packages to one or more of the online shoppers based on a defined matching of said analyzed driving patterns of the pool of candidate delivery drivers with the analyzed activities of the online shoppers and based on a correlating of a package delivery destination with a candidate driver's identified driving route; and wherein the sending a message comprises: selecting a first driver of the pool of candidate delivery drivers to deliver a first package to a package delivery destination of one of the online shoppers, and delivering the first package to the first driver by:

identifying a location of a vehicle of the first driver, delivering the first package to said location, from a location remote from the vehicle, the first driver providing access to a trunk of the vehicle by communicating, from a mobile communications device at the remote location, a signal for receipt at a trunk opener of said vehicle, said communicated signal received at said trunk opener to automatically open a trunk compartment of the vehicle in response to said received signal, placing the package in the opened trunk compartment of the vehicle, and the first driver, from a location remote from the vehicle, terminating the access to said opened trunk compartment of the vehicle after the package has been placed in said opened trunk compartment, the first driver delivering the first package to the package delivery destination of one of the online shoppers by following a specified route that minimally deviates from that first driver's identified route and route time without impacting an expected package delivery time.

2. The method according to claim 1, wherein the sending a message to contact one or more of the pool of candidate drivers to deliver one or more packages to one or more of the online shoppers includes:

selecting a first driver of the pool of candidate delivery drivers to deliver a first package to one of the online shoppers;

the first driver receiving the first package;

the first driver transferring the first package to another driver of the pool of candidate delivery drivers; and said another driver delivering the first package to the one of the online shoppers.

3. The method according to claim 2, wherein the first driver transferring the first package to the another driver includes:

receiving a request from the first driver for an alternate driver to deliver the first package to the one of the online shoppers; and selecting the another driver from the pool of candidate delivery drivers based on locations of the candidate drivers in the pool of candidate drivers, and a specified matching of the analyzed driving patterns of the pool of candidate delivery drivers with the specified route of the first delivery driver.

4. The method according to claim 3, wherein the first driver transferring the first package to the another driver further includes:

the another driver notifying the first driver of a location at which to transfer the first package; and the first driver driving to said location to transfer the first package.

5. The method according to claim 1, wherein:

the delivering the first package to said location includes a specified delivery company delivering the first package to said location, and sending a picture of the first driver to confirm that the delivery company has arrived at the location of the vehicle; and the first driver providing access to a limited area of the vehicle includes the first driver providing said access in response to receiving said picture.

6. The method according to claim 1, wherein:

the analyzing driving patterns of the pool of candidate delivery drivers includes monitoring specified driving practices of the candidate delivery drivers; and the sending a message to contact one or more of the pool of candidate delivery drivers to deliver one or more packages includes contacting only one or more of the pool of candidate delivery drivers whose monitored driving practices meet set standards.

7. A computer system comprising:

a memory for storing data; and one or more processing units connected to the memory for sending data to and receiving data from the memory, said one or more processing units being configured for identifying a pool of candidate delivery drivers, each of the candidate delivery drivers of the pool of candidate delivery drivers having an associated mobile communications device, wherein the identifying a pool of candidate delivery drivers includes receiving requests from persons to be in the pool of candidate delivery drivers, and the request from each of said persons including an agreement by said each person to an anonymous analysis of travel patterns of said each person;

tracking, based on location data received from a geolocation system over time, locations of each candidate delivery driver's mobile communications device to obtain specified changes in locations of the mobile communication devices associated with each driver of the pool of candidate delivery drivers;

using said obtained specified changes in locations to identify a driving pattern of each respective candidate delivery driver of the pool of candidate delivery drivers;

analyzing the driving patterns of the pool of candidate delivery drivers in a given geographic area, wherein the analyzing driving patterns of the pool of candidate delivery drivers includes identifying routes within the given geographic area, and times of the identified routes, of the pool of candidate delivery drivers;

analyzing activities of specified online shoppers in said given geographic area;

sending a message over a communications network to contact one or more of the pool of candidate drivers to deliver one or more packages to one or more of the online shoppers based on a defined matching of said analyzed driving patterns of the pool of candidate delivery drivers with the analyzed activities of the online shoppers, and based on a correlating of a package delivery destination with a candidate driver's identified driving route; and wherein the sending a message comprises: selecting a first driver of the pool of candidate delivery drivers to deliver a first package to a package delivery destination of one of the online shoppers, and delivering the first package to the first driver by:

identifying a location of a vehicle of the first driver, delivering the first package to said location, from a location remote from the vehicle, the first driver providing access to a trunk of the vehicle by communicating, from a mobile communications device at the remote location, a signal for receipt at a trunk opener of said vehicle, said communicated signal received at said trunk opener to automatically open a trunk compartment of the vehicle in response to said received signal, placing the package in the opened trunk compartment of the vehicle, and the first driver, from a location remote from the vehicle, terminating the access to said opened trunk compartment of the vehicle after the package has been placed in said opened trunk compartment, the first driver delivering the first package to the package delivery destination of one of the online shoppers by following a specified route that minimally deviates from that first driver's identified route and route time without impacting an expected package delivery time.

8. The computer system according to claim 7, wherein the sending a message to contact one or more of the pool of candidate drivers to deliver one or more packages to one or more of the online shoppers includes:

selecting a first driver of the pool of candidate delivery drivers to deliver a first package to one of the online shoppers, the first driver following a specified route to deliver the first package to the one of the online shoppers;

receiving a request from the first driver for an alternate driver to deliver the first package to the one of the online shoppers; and selecting the another driver from the pool of candidate delivery drivers based on locations of the candidate drivers in the pool of candidate drivers, and a specified matching of the analyzed driving patterns of the pool of candidate delivery drivers with the specified route of the first delivery driver.

9. The computer system according to claim 7, wherein:

the analyzing driving patterns of the pool of candidate delivery drivers includes monitoring specified driving practices of the candidate delivery drivers; and the sending a message to contact one or more of the pool of candidate delivery drivers to deliver one or more packages includes contacting only one or more of the pool of candidate delivery drivers whose monitored driving practices meet set standards.

10. A computer readable program storage device comprising:

a computer readable storage medium having program instructions embodied therein, the program instructions executable by a computer to cause the computer to perform the method of:

identifying a pool of candidate delivery drivers, each of the candidate delivery drivers of the pool of candidate delivery drivers having an associated mobile communications device, wherein the identifying a pool of candidate delivery drivers includes receiving requests from persons to be in the pool of candidate delivery drivers, and the request from each of said persons including an agreement by said each person to an anonymous analysis of travel patterns of said each person;

tracking, based on location data received from a geo-location system over time, locations of each candidate delivery driver's mobile communications device to obtain specified changes in locations of the mobile communication devices associated with each driver of the pool of candidate delivery drivers;

using said obtained specified changes in locations to identify a driving pattern of each respective candidate delivery driver of the pool of candidate delivery drivers;

analyzing the driving patterns of the pool of candidate delivery drivers in a given geographic area, wherein the analyzing driving patterns of the pool of candidate delivery drivers includes identifying routes within the given geographic area, and times of the identified routes, of the pool of candidate delivery drivers;

analyzing activities of specified online shoppers in said given geographic area;

sending a message over a communications network to contact one or more of the pool of candidate drivers to deliver one or more packages to one or more of the online shoppers based on a defined matching of said analyzed driving patterns of the pool of candidate delivery drivers with the analyzed activities of the online shoppers and based on a correlating of a package delivery destination with a candidate driver's identified driving route; and wherein the sending a message comprises: selecting a first driver of the pool of candidate delivery drivers to deliver a first package to a package delivery destination of one of the online shoppers, and delivering the first package to the first driver by:

identifying a location of a vehicle of the first driver, delivering the first package to said location, from a location remote from the vehicle, the first driver providing access to a trunk of the vehicle by communicating, from a mobile communications device at the remote location, a signal for receipt at a trunk opener of said vehicle, said communicated signal received at said trunk opener to automatically open a trunk compartment of the vehicle in response to said received signal, placing the package in the opened trunk compartment of the vehicle, and the first driver, from a location remote from the vehicle, terminating the access to said opened trunk compartment of the vehicle after the package has been placed in said opened trunk compartment, the first driver delivering the first package to the package delivery destination of one of the online shoppers by following a specified route that minimally deviates from that first driver's identified route and route time without impacting an expected package delivery time.

11. The computer readable program storage device according to claim 10, wherein the sending a message to contact one or more of the pool of candidate drivers to deliver one or more packages to one or more of the online shoppers includes:

selecting a first driver of the pool of candidate delivery drivers to deliver a first package to one of the online shoppers, the first driver following a specified route to deliver the first package to the one of the online shoppers;

receiving a request from the first driver for an alternate driver to deliver the first package to the one of the online shoppers; and selecting the another driver from the pool of candidate delivery drivers based on locations of the candidate drivers in the pool of candidate drivers, and a specified matching of the analyzed driving patterns of the pool of candidate delivery drivers with the specified route of the first delivery driver.

12. The computer readable program storage device according to claim 10, wherein:

the analyzing driving patterns of the pool of candidate delivery drivers includes monitoring specified driving practices of the candidate delivery drivers; and the sending a message to contact one or more of the pool of candidate delivery drivers to deliver one or more packages includes contacting only one or more of the pool of candidate delivery drivers whose monitored driving practices meet set standards.

* * * * *